Dec. 25, 1928.
L. C. ROBERTS
1,696,415
VOLTAGE BALANCE REGULATOR
Filed Aug. 9, 1927
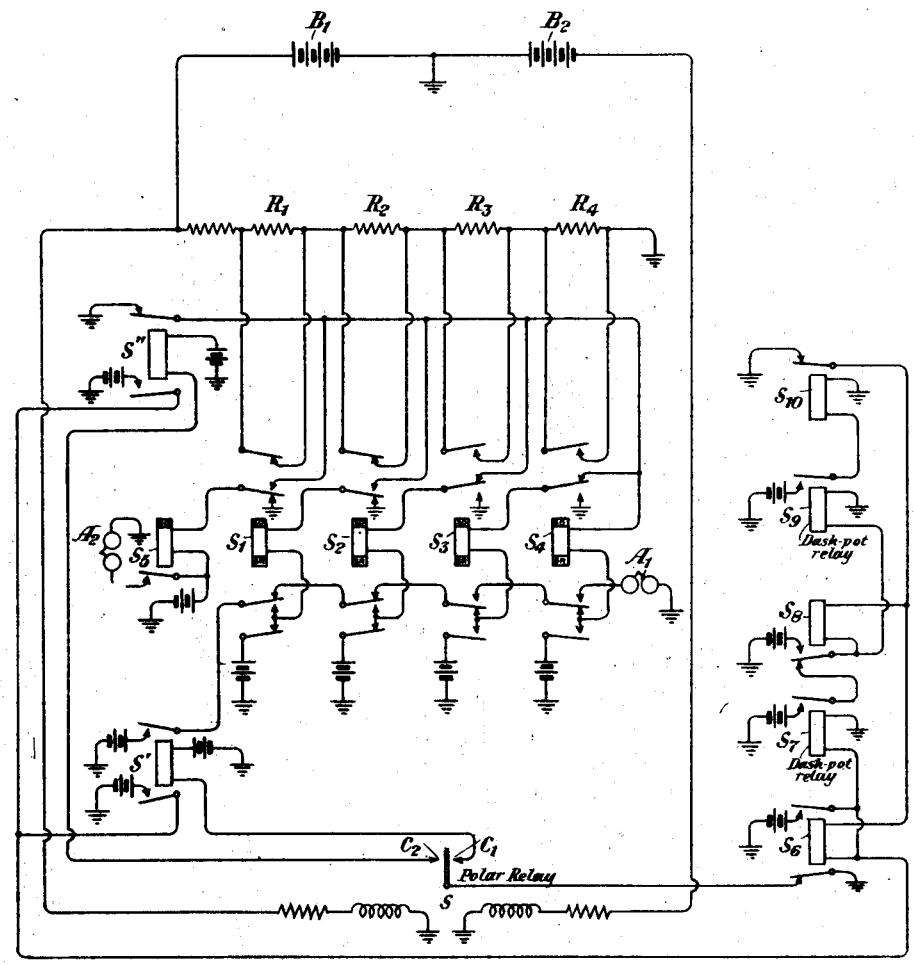
First set of contacts above each of Relays $S_1$, $S_2$, $S_3$, and $S_4$ – make before break.
Contacts below each of Relays $S_1$, $S_2$, $S_3$, and $S_4$ – lower contacts must make before upper contacts break.
INVENTOR.
L. C. Roberts
BY
ATTORNEY Patented Dec. 25, 1928.

1,696,415

UNITED STATES PATENT OFFICE.

LELAND C. ROBERTS, OF TOWACO, NEW JERSEY, ASSIGNOR TO AMERICAN TELEPHONE AND TELEGRAPH COMPANY, A CORPORATION OF NEW YORK.

VOLTAGE-BALANCE REGULATOR.

Application filed August 9, 1927. Serial No. 211,830.

This invention relates to voltage balance regulators, and more particularly to automatic means for regulating approximately to a balance the voltages of two sources subject to unequal average working drains.

It is the object of the invention to provide a suitable circuit arrangement for maintaining approximately equal the voltages of, for instance, batteries used with apparatus such as metallic telegraph repeaters involving the single commutation method of transmission.

In the case of telegraph repeaters of the above named class, it is important that the battery voltages be balanced or approximately balanced, since any unbalance of the voltages produces bias in the signals. According to present maintenance methods, the voltages of such batteries are adjusted by hand, an alarm calling an attendant when the unbalance exceeds a definite amount, for instance, 5%.

The applicant's automatic regulator will reduce the voltage unbalance to a greater degree than is practicable with the manual method of adjustment, and will render it unnecessary for an attendant to make any but infrequent manual adjustments.

The invention consists in general of an auxiliary drain path across the battery subject to the smaller average working drain, means responsive to unbalances of the voltages for changing the load on that battery through the auxiliary path in a direction to restore the balance, and means for giving an alarm to summon the attendant if the changes of the auxiliary load have failed to restore the balance.

The invention will be more clearly understood when the following detailed description of the regulator circuits and their operation is read with reference to the accompanying drawing, which shows in diagrammatic form one desirable circuit arrangement.

The two batteries the voltages of which are to be balanced or approximately balanced are shown in the drawing as $B_1$ and $B_2$. Of these batteries, $B_1$ has the smaller normal working drain. Across this battery there is connected an auxiliary path, including the fixed resistances $R_1$, $R_2$, $R_3$ and $R_4$, the voltage of battery $B_1$ being regulated to approximate a balance by varying the load on the battery in this auxiliary path in response to unbalances of the voltages of the two batteries. It will be understood, of course, that if conditions should change so as to place the smaller average working drain on battery $B_2$, an attendant would connect the auxiliary drain path across that battery, when summoned by the trouble alarm indicating an unbalance unremediable by the changing of the load on battery $B_1$. A polar relay S has one of its operating windings connected in series with each of the batteries $B_1$ and $B_2$ to ground. The adjustment of this relay is such that normally its armature touches neither the left-hand contact nor the right-hand contact. The windings are so poled that when the battery voltages are equal, there will be no operating force on the armature, but an unbalance of the voltages will cause the relay to throw the armature in a direction depending on which battery voltage is the greater.

A chain of relays $S_1$, $S_2$, $S_3$ and $S_4$ is associated with, and the relays control short circuits around, the resistances $R_1$, $R_2$, $R_3$ and $R_4$, respectively. Of these relays, $S_1$ and $S_2$ are shown in operated condition, while relays $S_3$ and $S_4$ are shown unoperated. All four relays are both slow-operating and slow-releasing. Control relays S' and S'' are designed to respond to the operation of the polar relay S, one for each direction of operation, and to control the operations of the four relays discussed above.

Let it be assumed that the polar relay S has its winding so poled and its armature so adjusted that when the voltage of battery $B_1$ exceeds that of battery $B_2$, the armature will touch contact $C_1$ at the right, while an excess of voltage in battery $B_2$ will cause the armature to touch the left-hand contact $C_2$. If, now, the battery $B_1$ has the greater voltage, and the armature of relay S is thrown to the right-hand contact, a circuit is completed through battery and the winding of relay S' to ground over the lower contact of a relay $S_6$, to be considered more fully hereinafter, and relay S' operates, it being a condition of this operation, of course, that relay $S_6$ be unoperated. With the relays of the chain indicated above in the condition shown in the drawing, this operation of relay S' will close a circuit from battery through contacts of relays $S_1$, $S_2$ and $S_3$, through the winding of relay $S_3$ to ground over the upper contact of relay S″. Relay $S_3$ will operate and will lock up, the circuit being from battery through its lowest contact to ground over the contact of relay S″. The operation of relay $S_3$ will place a short circuit around the fixed resistance $R_3$ of the auxiliary drain path, increasing the drain through this path on battery $B_1$. This increase of drain will, of course, tend to restore the balance of the voltages of batteries $B_1$ and $B_2$. If this adjustment is not sufficient to restore the two voltages to approximate balance, or if a further unbalance in the same direction occurs, relay S′ will operate again after a time interval, fully discussed hereinafter, has elapsed. Since relay $S_3$ has been operated and locked up, a path is prepared through the winding of relay $S_4$, and this second operation of relay S′ will cause the operation of relay $S_4$ to place a short circuit around the resistance $R_4$, further increasing the auxiliary load on battery $B_1$.

If further correction in the same direction is required, and relay S′ operates a third time, a circuit which was prepared by the operation of relay $S_4$ will be completed through battery and a bell $A_1$. The ringing of this bell summons the attendant.

Since a considerable period of time elapses between the changing of the load on a battery and the effect of that change in the voltage of the battery, means must be provided in connection with the regulating circuits to cause a substantial delay between an operation of relay S′ or relay S″ (to be more fully discussed hereinafter) and a subsequent operation of either one of these two relays. A suitable means for furnishing this delay is the chain of relays shown at the right of the drawing and comprising relays $S_6$, $S_7$, $S_8$, $S_9$ and $S_{10}$, connected as shown. This delay circuit operates as follows, it being understood that all the relays of the chain are normally in unoperated condition: When either relay S′ or relay S″ operates, a circuit is closed from battery and ground through the winding of relay $S_6$ to ground over the closed contact of relay $S_{10}$. The completion of this circuit causes the operation of relay $S_6$, and ground is removed by the lower armature from the path through one contact of polar relay S and the winding of relay S′ or relay S″ (the former in the detailed operation discussed above). Considering in particular, for the present, only the operation resulting from an excess of voltage in battery $B_1$, the operation of relay $S_6$ releases relay S′. The operating time of relay $S_6$ and the time required for the release of relay S′ must be at least as great as the operating time of relays $S_1$—$S_4$ or the time required for the release of those relays. In addition, the operation of relay $S_6$ completes a locking circuit through the winding of relay $S_6$, ground being reached over the contact of relay $S_{10}$, and also completes a circuit through battery and the winding of relay $S_7$, causing the operation of this relay, which is a dash-pot relay having a very slow operating time, one to two minutes, for instance, but is quick releasing. The operation of the dash-pot relay $S_7$ causes the operation of relay $S_8$, which in turn is followed by the operation of a second dash-pot relay $S_9$. Relay $S_8$ locks up through a circuit having a ground connection over the contact of relay $S_{10}$. When relay $S_9$ operates, it causes the operation of relay $S_{10}$, which operation in turn breaks the locking circuits though relays $S_6$ and $S_8$, releasing the entire chain of relays of the delay circuit. With relays $S_7$ and $S_9$ dash-pot relays, it is readily understood that a delay of from two to four minutes is provided. Of course, the extension of the chain and the insertion of additional dash-pot relays would provide for a still greater delay. Again, any other suitable delay circuit, for instance, an arrangement involving a selecting switch to be stepped forward a definite number of times by consecutive operations of a dash-pot relay, may be employed to provide the necessary delay, without a departure from the scope of the applicant's invention.

The operation of the circuits in response to an excess of voltage in battery $B_2$, it being assumed that the relays are again in the positions shown in the drawing, will be as follows: The polar relay S throws its armature to the left-hand contact, and the control relay S″ operates. This operation, as indicated above, sets in operation the relays of the delay circuit, which has been described in detail above and will not be further discussed at this point. The operation of relay S″ removes ground from the circuit including the winding of relay $S_2$, and relay $S_2$ releases, breaking the short circuit around the resistance $R_2$. This, of course, puts this resistance effectively in the auxiliary path across battery $B_1$, decreasing the drain on the battery over that path. Consequently, the voltage of the battery rises, the tendency being toward a balance of the two battery voltages. If the voltage of battery $B_2$ remains or again becomes greater than that of battery $B_1$, relay S″ is again operated after the usual delay and causes the release of relay $S_1$. This release breaks the short circuit around the resistance $R_1$, places this resistance effectively in the auxiliary drain path and increases the effective working voltage of battery $B_1$. When relay $S_1$ released, it connected a circuit through the winding of relay $S_5$ to ground over the upper contact of relay S″ (with relay S″ released). Accordingly, if relay S operates again as a result of a further or continued voltage unbalance, relay $S_5$ is released, and battery is connected through the bell $A_2$, causing an attendant to be summoned.

It has been stated above that relays $S_1$, $S_2$, $S_3$ and $S_4$ are both slow operating and slow releasing. The reason for this is to prevent the operation of more than one of these relays for a single operation of relay S. In addition, it should be noted that relay $S_5$ is slow operating. Furthermore, as is indicated on the drawing, the contacts controlled by the lowest armature of each of the relays $S_1$, $S_2$, $S_3$ and $S_4$ must make before the contact controlled by the armature of that relay next above breaks. Likewise, in the case of each of these four relays, the contacts shown above the electro-magnet must make or break, as indicated on the drawing.

While the invention has been disclosed in one specific embodiment, which is deemed desirable, this disclosure being for the purpose of clear illustration, it is to be understood that the scope of the invention is not limited thereby, but is defined by the appended claims.

What is claimed is:

1. In association with two sources of electric current subject to different average working drains, an automatic system for maintaining an approximate balance of the voltages of the two sources, said system comprising means for placing an auxiliary load on the source subject to the smaller average working drain and means responsive to unbalances of the source voltages for changing said auxiliary load to restore the balance of the voltages.

2. In association with two sources of electric current subject to different average working drains, an automatic system for maintaining an approximate balance of the voltages of the two sources, said system comprising means for placing an auxiliary load on the source subject to the smaller average working drain, means responsive to unbalances of the source voltages for changing said auxiliary load to restore the balance of the voltages, and means for giving an alarm if such changes fail to restore said balance.

3. In association with two sources of electric current subject to different average working drains, an automatic system for maintaining an approximate balance of the voltages of the two sources, said system comprising means for placing an auxiliary load on the source subject to the smaller average working drain, means responsive to unbalances of the source voltages for changing said auxiliary load to restore the balance of the voltages, means for giving an alarm if such changes fail to restore said balance, and means for introducing a delay between any two successive operations of the load changing and alarm giving means.

4. In association with two sources of electric current subject to different average working drains, an automatic system for maintaining an approximate balance of the voltages of the two sources, said system comprising an auxiliary path across the source subject to the smaller average working drain, means responsive to unbalances of the source voltages for changing the load on said source through said path to restore the balance of the voltages, and means for giving an alarm if such changes fail to restore said balance.

5. In association with two sources of electric current subject to different average working drains, an automatic system for maintaining an approximate balance of the voltages of the two sources, said system comprising an auxiliary drain path cross the source subject to the smaller average working drain, a plurality of means responsive to unbalances of the two voltages for changing the resistance of the auxiliary path to restore the balance of the voltages, and means for giving an alarm if such changes fail to restore said balance.

6. In association with two sources of electric current subject to different average working drains, an automatic system for maintaining an approximate balance of the voltages of the two sources, said system comprising an auxiliary path across the source subject to the smaller average working drain, means responsive to unbalances of the source voltages for changing the load on said source through said path to restore the balance of the voltages, means for giving an alarm if such changes fail to restore said balance, and means for introducing a delay between any two successive operations of the load changing and alarm giving means.

7. In association with two sources of electric current subject to different average working drains, an automatic system for maintaining an approximate balance of the voltages of the two courses, said system comprising an auxiliary drain path across the source subject to the smaller average working drain, a plurality of means responsive to unbalances of the two voltages for changing the resistance of the auxiliary path to restore the balance of the voltages, means for giving an alarm if such changes fail to restore said balance, and means for introducing a delay between any two successive operations of the resistance changing and alarm giving means.

8. In association with two sources of electric current subject to different average working drains, an automatic system for maintaining an approximate voltage balance of the two sources, said system comprising an auxiliary drain path across the source subject to the smaller average working drain, means for decreasing the resistance of said path in response to an excess of the voltage of said source, means for giving an alarm if such decrease fails to balance the two voltages, means for increasing the resistance of said path in response to a deficiency of the voltage of said source, means for giving an alarm if such increase fails to balance the two voltages, and means for introducing a delay between two successive operations of any of said means.

9. In association with two sources of electric current subject to different average working drains, an automatic system for maintaining an approximate voltage balance of the two sources, said system comprising means associated with the source subject to the smaller average working drain and responsive to an excess of the voltage thereof for increasing the load on said source, means responsive to a continued excess of said voltage for further increasing said load, means responsive to a further continued similar excess for giving an alarm, means associated with said source and responsive to a deficiency of the voltage thereof for decreasing the load on said source, means responsive to a continued deficiency of said voltage for further decreasing said load, means responsive to a further continued similar deficiency for giving an alarm, and means for introducing a time interval between changes of said load and between a change of said load and the giving of an alarm.

10. In association with two sources of electric current subject to different average working drains, an automatic system for maintaining an approximate voltage balance of the two sources, said system comprising a variable resistance shunt across the source subject to the smaller average working drain, means responsive to an excess of the voltage of said source for decreasing the resistance thereacross, a second means responsive to a continued similar excess of voltage for further decreasing said resistance, means responsive to a further continuation of a similar excess of voltage for giving an alarm, means responsive to a deficiency of said voltage for increasing the resistance across said source, a second means responsive to a continued similar deficiency of voltage for further increasing said resistance, means responsive to a further continuation of a similar deficiency of voltage for giving an alarm, and means for separating by a time interval any two successive operations of the resistance decreasing and increasing and the alarm producing means.

11. In association with two sources of electric current subject to different average working drains, an automatic system for maintaining an approximate voltage balance of the two sources, said system comprising a variable resistance shunt across the source subject to the smaller average working drain, a plurality of means for increasing each by a given amount the resistance of said shunt, a plurality of means for decreasing said resistance, each by a given amount, an alarm annunciator associated with the resistance increasing means, an alarm annunciator associated with the resistance decreasing means, a first controlling relay for actuating the resistance increasing means and the annunciator associated therewith in succession, one for each operation of said relay, a second controlling relay for actuating the resistance decreasing means and the annunciator associated therewith in succession, one for each operation of said relay, means responsive to a deficiency of the voltage of the source subject to the smaller average working drain for actuating said first controlling relay, means responsive to an excess of said voltage for actuating said second controlling relay, and means for introducing a time interval between successive operations of said controlling relays.

In testimony whereof, I have signed my name to this specification this 8th day of August, 1927.

LELAND C. ROBERTS.